United States Patent Office 3,435,804
Patented Apr. 1, 1969

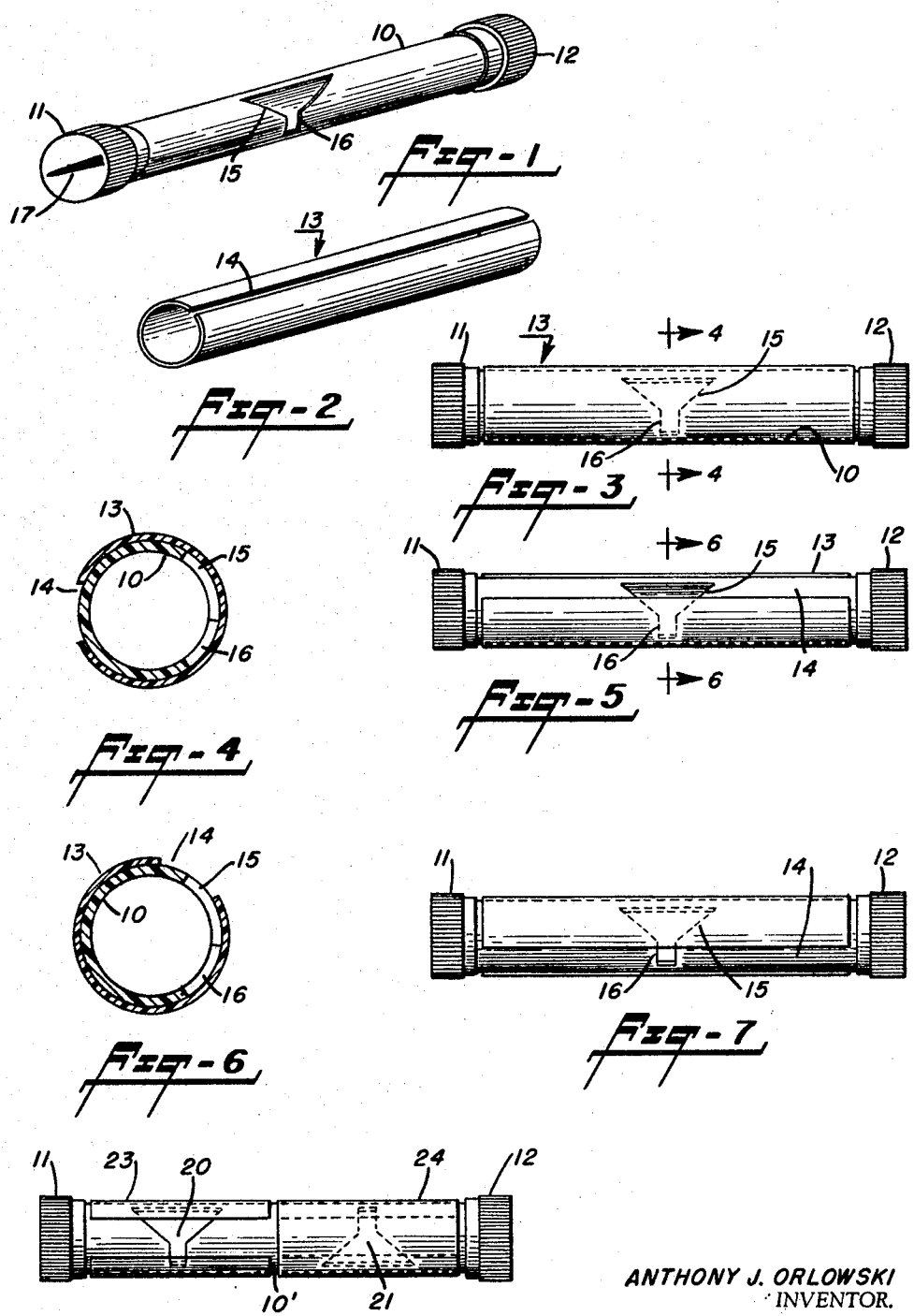

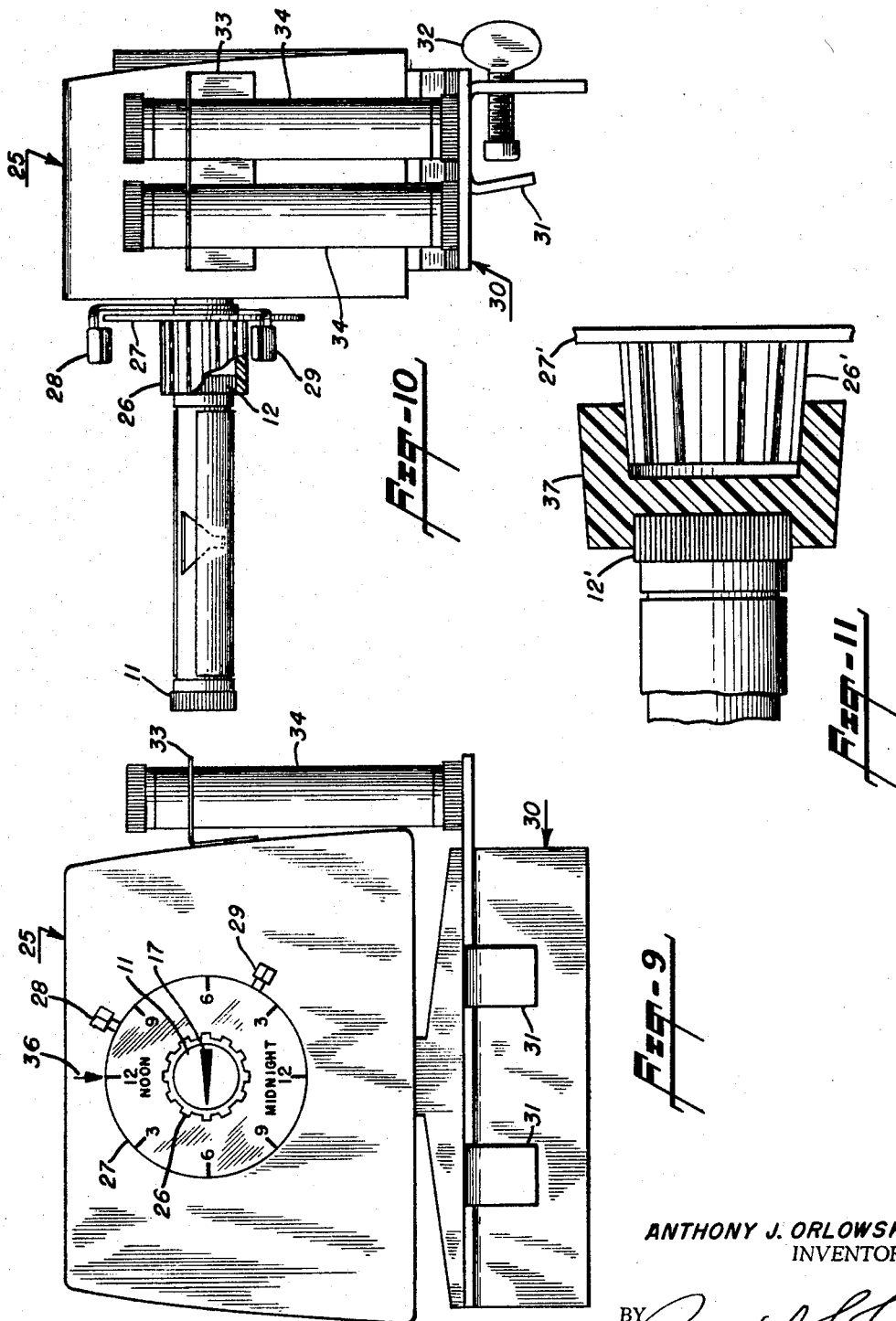

3,435,804
AUTOMATIC FISH FEEDER
Anthony J. Orlowski, 51 W. 48th St.,
Bayonne, N.J. 07002
Filed Apr. 10, 1967, Ser. No. 629,680
Int. Cl. A01k 61/02; B65d 83/06
U.S. Cl. 119—51.11       10 Claims

ABSTRACT OF THE DISCLOSURE

A tubular food container, provided with an adjustable discharge opening, is attachable to the time dial of an electric timer to gradually dispense a predetermined quantity of fish food into an aquarium.

Background of the invention

The invention relates to apparatus for automatically effecting intermittent feeding of fish over a selected time period.

Automatic fish feeding apparatus of various types are available. Certain prior apparatus comprises a food container rotatable by an electric motor and provided with a discharge opening, food being discharged through the opening by gravity. Other apparatus comprises a reciprocating piston which pushes the food over openings formed in the bottom of the food container. Generally, the prior apparatus is of relatively complex and/or costly construction and is restricted for use with a particular type of food, such as granular or flaky. Also, the prior arrangements for mechanically coupling the food dispenser to the drive motor are such that it is not conveniently detachable therefrom. Further, the orientation of the discharge opening, of the food container, relative to a time dial is not readily adjustable for the purpose of changing the time period during which the food is dispensed into the aquarium.

In apparatus made in accordance with this invention, the food is contained in a disposable capsule arranged for frictional attachment to the time dial of a conventional electric timer. The food discharge opening formed in the capsule has a novel configuration such that the capsule can be used for dispensing either granular or flaky food, and such opening is conveniently adjustable to discharge a desired quantity of food over a given time period, such time period being adjustable, by the user, to a selected hour of the day or night.

Summary of the invention

The food container is a plastic capsule, having a discharge opening formed in the wall thereof, such opening being defined by a generally triangular-shaped section having an apex terminating in a generally rectangular-shaped section. A cylindrical sleeve member, provided with a longitudinal slot, snugly encircles the capsule and is rotatably positionable about the capsule so that the slot will intersect a selected portion of the discharge opening. End caps are attached to the capsule, one end cap being removable to permit refilling of the capsule, if desired. The capsule is frictionally attachable to an electric timer as by pressing an end cap into an axial bore formed in the knob attached to the time dial of the timer. The capsule carries a fixed reference mark to facilitate the orientation of the capsule discharge opening relative to the time dial, thereby to effect feeding of the fish at a desired time.

An object of this invention is the provision of apparatus for automatically dispensing a predetermined quantity of food into an aquarium, or the like, over a selected time period.

An object of this invention is the provision of fish feeding apparatus comprising a food capsule frictionally attachable to the time dial of a conventional electric timer, said food capsule being provided with an adjustable discharge opening of a configuration such that the capsule is adapted for use with either granular or flaky fish food.

An object of this invention is the provision of a disposable capsule for fish food, comprising a tube having a discharge opening formed in the wall thereof, which opening comprises two sections of different longitudinal lengths, and a cylindrical member encircling said tube and having a longitudinal slot formed therein, said cylindrical member being rotatable about the said tube to position the said slot at a desired orientation with respect to the said discharge opening.

The above-stated and other objects and advantages of the invention will become apparent from the following description when taken with the accompanying drawings. It will be understood, however, that the drawings are for purposes of illustration and are not to be construed as defining the scope of limits of the invention, reference being had for the latter purpose to the claims appended hereto.

Brief description of the drawings

In the drawings wherein like reference characters denote like parts in the several views;

FIGURE 1 is an isometric view of a tubular member having a discharge opening formed in the wall thereof, said member constituting one element of a disposable food capsule made in accordance with one embodiment of this invention;

FIGURE 2 is a similar view of the cooperating cylindrical sleeve member;

FIGURE 3 is a side elevational view showing the sleeve member assembled onto the tubular member and positioned to close the discharge opening;

FIGURE 4 is an enlarged cross-sectional view taken along the line 4—4 of FIGURE 3;

FIGURE 5 is similar to FIGURE 2 but showing the sleeve member rotated to a position wherein one portion of the discharge opening is uncovered;

FIGURE 6 is an enlarged cross-sectional view taken along the line 6—6 of FIGURE 5;

FIGURE 7 is similar to FIGURE 5 but showing the sleeve member rotated to a position wherein another portion of the discharge opening is uncovered;

FIGURE 8 is a side elevational view of a food capsule made in accordance with another embodiment of this invention;

FIGURE 9 is a front elevational view showing the food capsule attached to the time dial of a conventional electric timer;

FIGURE 10 is a corresponding side elevational view with a portion of the timer knob broken away; and FIGURE 11 is an enlarged fragmentary side elevational view showing an adapter for coupling the food capsule to a timer knob, with a portion of the adapter broken away.

Reference now is made to FIGURES 1-4 showing a food capsule made in accordance with one embodiment of this invention, such capsule comprising a relatively thin-walled tube 10, end caps 11 and 12 and a cylindrical sleeve member 13 having a slot 14 extending the full length thereof. A food discharge opening is formed in the tube which opening comprises a generally triangular shaped section 15 terminating in a generally rectangular section 16. The sleeve member 13 is formed to have a normal diameter less than the outside diameter of the tube and has an axial length somewhat less than the spacing between the shank portions of the end caps. Thus, the sleeve member can be snapped into position over the tube as shown in FIGURE 3. In such assembly, the sleeve member is clampingly attached to the tube and is rotatable to position the somewhat expanded slot in a desired angular orientation relative to the two sections of the food discharge opening. In FIGURE 3, the sleeve member is positioned to completely close both sections 15 and 16 of the discharge opening, that is, the slot 14 of the sleeve member is positioned as shown in the cross-sectional view of FIGURE 4.

One of the end caps, specifically the end cap 11, is secured to the tube in fixed position, as by means of a suitable adhesive, and carries a reference mark 17. As shown, the reference mark 17 is of a triangular shape with the apex oriented at an angle of substantially 180 degrees relatively to the point of intersection of the two sections 15 and 16 of the tube discharge opening. As will be described hereinbelow, the reference mark serves as a point of reference whereby the user can attach the capsule to a timer for the dispensing of food at a selected time period. The other end cap 12 is detachable from the tube for the purpose of filling the tube. Preferably, the tube 10 and the sleeve member 13 are made of a clear plastic, affording a visual check of the quantity of food contained in the capsule. The end caps are made of an opaque plastic and have fluted peripheral surfaces. It is here pointed out that the described capsule is a low cost item which can be sold as a disposable food container by the manufacturer of fish foods. Having purchased food in such capsule, the user can refill such capsule, if desired.

In FIGURES 5 and 6, the sleeve member 13 has been rotated about the tube 10 so that slot 14 uncovers a portion of the triangular-shaped section 15 of the tube discharge opening. The remaining portion of the opening 15 and the entire rectangular portion 16 is covered by the sleeve member. By rotating the sleeve member slightly from the illustrated position, more or less of the opening 15 can be uncovered, thereby to increase or decrease the rate of flow of the food out of the capsule, by gravity, upon rotation of the capsule about its axis. The area of the opening 15 is relatively large, as compared to that of the rectangular opening 16, and is used as the food dispensing opening when the capsule contains food of a flaky character. When the capsule contains a granular food, the sleeve member is rotated to uncover a desired portion of the rectangular discharge opening 16, as shown in FIGURE 7. It will now be apparent that the discharge opening formed in the wall of the tube 10 has relatively narrow and wide portions, taken longitudinally of the tube, so that the same capsule is adapted for use with either granular or flaky food. The effective length of each such opening, taken peripherally of the tube 10, is determined by the setting of the sleeve member. Thus, the sleeve member serves several purposes, namely, (a) as a means for closing the capsule during filling and/or transport thereof, (b) as a means for selecting a particular portion of the tube opening as a discharge opening for contained food of a particular character, and (c) as an adjustable gate to control the rate of flow of the food through the selected portion of the discharge opening.

FIGURE 8 shows a capsule constructed and arranged for dispensing granular and flaky food either simultaneously or at different time periods. In this case, the tube 10′ is provided with two discharge openings 20, 21 each such opening having the same configuration as described with reference to FIGURE 1. As shown in FIGURE 8, the openings 20 and 21 are formed in opposed wall portions of the tube 10′. The slotted sleeve members 23 and 24, each having one-half the length of the sleeve member 13 shown in FIGURE 1, are clampingly secured to the tube 10 and such sleeve members are individual rotatable about the tube to uncover a desired portion of the associated tube openings. For example, the sleeve member 23 can be set to expose the full triangular-shaped portion of the associated opening 20, and the sleeve member 24 can be set to expose the full rectangular portion of the associated opening 21. Such exposed portions of the two openings 20 and 21 are spaced apart substantially 180 degrees. Thus, if the left half of the capsule is filled with a flaky food and the right half with a granular food, the food will be dispensed alternately from one and the other of such openings upon axial rotation of the capsule. It will be apparent that if the opening 21 also is formed in the forward wall of the tube 10′, the food will be dispensed simultaneously from both openings upon axial rotation of the capsule.

Reference now is made to FIGURE 9 and 10 wherein there is shown a conventional electric timer 25 having a knob 26 attached to a time dial 27 which rotates one revolution every 24 hours. Timers of this type include tabs 28 and 29 individually settable with reference to the dial, whereby the timer will close and open an electrical circuit at the selected time periods. When used in connection with an aquarium, the timer can be used to control lights and/or aerating pump. An L-shaped mounting bracket 30 is secured to the timer, said bracket including offset ears 31 aligned with thumb screws 32 for securing the timer to a wall of an aquarium. A second bracket 33 secured to the side wall of the timer, is provided with two holes for accommodating two food capsules 34, said capsules resting upon an extension of the mounting bracket 30. The timer knob 26 has an axial bore formed therein, said bore having a diameter such that the end cap 12, of a food capsule, can be force-fitted into the bore, as shown, the fluted peripheral surface of the cap 12 serving to facilitate the insertion of the cap into the bore of the knob and to retain the capsule in frictional attachment to the knob. The attached capsule lies substantially in a horizontal plane spaced about the water in the aquarium, and rotates substantially about its axis once during each 24 hour period.

The timer and the capsule are set as follows to dispense food at a desired time period. Assuming the timer is being set at 12 o'clock noon, the timer dial 27 is rotated, by hand, to align the hour numeral 12 with the fixed reference mark 36 of the timer, as shown. Assuming now, that it is desired to feed the fish at a mean time of 6:00 p.m., the end of the capsule is inserted into the bore of the timer knob with the capsule reference mark 17 in alignment with the dial numeral 6, as shown. As explained hereinabove, the end cap 11 is secured in fixed position to the tube of the capsule and the apex of the mark 7 in alignment with the dial numeral 6, as shown. As explained hereinabove, the end cap 11 is secured in fixed position to th tube of the capsule and the apex of the mark 17 is opposite the tube discharge opening. The capsule rotates with the timer dial and at some time prior to 6:00 p.m. the tube discharge opening will be in a position such that food will start flowing out of the capsule, by gravity. Such flow will continue until sometime after 6:00 p.m. It will be apparent that the maximum time period during which food is dispensed into the aquarium depends upon the angular extent of the uncovered portion of the discharge opening, which, in turn, depends upon the setting of the sleeve member of the capsule. Desirably, the food should be dispensed into the aquarium slowly over a period of several hours so that all of the food will be consumed, leaving none to stagnate and pollute the aquarium.

In the event it is desired to change the quantity of food dispensed, this can be done without detaching the food capsule from the timer and without changing the mean time of the feeding operation. The fixed end cap 11 is held by the fingers of one hand while the sleeve member is rotated with the other hand to increase or decrease the effective size of the discharge opening. Also, since the food capsule is frictionally attached to the timer, it is a simple matter to rotate the entire capsule to align the reference mark 17 with a desired hour mark on the timer dial.

In operation, the capsule dispenses food slowly over several hours preceding and following the selected mean time. During the food-dispensing period, the dispensed food results in the formation of a triangular-shaped furrow extending to either side of the discharge opening. As the capsule rotates through-out the non-feeding period, such furrow disappears due to the tumbling action of the food and the contained food is spread substantially uniformly throughout the capsule prior to the start of the next feeding cycle. Thus, the quantity of food discharge during each feeding cycle remains substantially constant until the capsule is almost empty.

In the arrangement shown in FIGURES 9 and 10, the feeding cycle occurs once during each 24 hour period at the selected mean time. With a capsule having two discharge openings, as shown in FIGURE 8, two different foods can be dispensed into the aquarium simultaneously during one feeding cycle every 24 hours. Alternatively, the same type food can be dispensed during two feeding cycles spaced apart by a time period of 12 hours, or two different type foods can be dispensed over such two feeding cycles.

Generally, a food capsule having a length of about four inches and a diameter of about ½ inch will contain a 7-10 day supply of food for the average home aquarium. In many conventional electric timers, the knob has a diameter such that an axial bore can be formed therein for receiving, directly, a capsule of this size. However, given a capsule and/or a timer knob of other diameters, an adapter, made of a suitable resilient material, can be provided for frictionally coupling the capsule to the knob. For example, and with reference to FIGURE 11, when the diameter of the capsule end cap 12' is large with respect to that of the timer knob, such end cap can be inserted into one bore formed in an adapter 37, said adapter being provided with a second bore of a size such that the adapter is frictionally attachable to the knob 26' attached to the timer dial 27'. Certain electric timers do not have a knob extending from the time dial. In such cases, the end surface of the adapter 37 can be coated with a suitable adhesive and the adapter secured centrally to the dial face.

Having now described the invention, those skilled in this art will be able to make various changes and modifications without thereby departing from the spirit and scope of the invention.

I claim:
1. A fish food dispersing capsule for aquariums and the like comprising
    (a) a first tubular member having a food discharge opening formed in the wall thereof,
    (b) end caps closing the ends of said tubular member, one of said caps providing means for attachment to a rotatable timing means, and,
    (c) a second tubular member having a slot formed in the wall thereof, said second tubular member being carried by and rotatable about the first tubular member to position said slot in radial alignment with the said discharge opening.

2. The invention as recited in claim 1, wherein the said slot extends the full length of the second tubular member and wherein the second tubular member has a normal diameter less than the outside diameter of the first tubular member.

3. The invention as recited in claim 1, wherein the said discharge opening has a non-uniform longitudinal length and wherein the said slot has a longitudinal length at least equal to the maximum length of the discharge opening.

4. The invention as recited in claim 3, wherein the said discharge opening comprises a generally triangular-shaped portion terminating in a generally rectangular-shaped portion.

5. The invention as recited in claim 1, wherein the said end caps have fluted peripheral surfaces, wherein one end cap is secured in fixed position to the first tubular member, and including a reference mark on the said one end cap, said mark having a predetermined angular orientation relative to the said discharge opening.

6. The invention as recited in claim 1, including a second food discharge opening formed in the wall of the first tubular member and spaced longitudinally from the other discharge opening, wherein the said second tubular member extends from one end cap to a point beyond the second discharge opening, and including a third tubular member carried by and rotatable about the said first tubular member, which third tubular member extends from the other end cap to a point beyond the said other discharge opening.

7. In combination,
    (a) an electric timer having a time dial calibrated in hours and attached to a knob,
    (b) a tubular food capsule having an adjustable food-dispensing opening and carrying a reference mark, and
    (c) means for frictionally attaching an end of the capsule to the said knob with the said reference mark aligned with a selected hour mark on the time dial.

8. The invention as recited in claim 7, wherein the capsule includes end caps, wherein the said knob has an axial bore formed therein, and wherein the capsule is attached to the knob by force-fitting an end cap into the said bore.

9. The invention as recited in claim 8, wherein the said adjustable food dispensing opening comprises a discharge opening formed in the wall of a tube which carries the end caps and a slot formed in a cylindrical sleeve member carried by and rotatable about the said tube.

10. The invention as recited in claim 9, wherein the said discharge opening comprises a generally triangular-shaped portion terminating in a generally rectangular-shaped portion, wherein the slot in the sleeve member extends the full length thereof, and wherein the sleeve member has a normal diameter less than the outside diameter of the said tube.

References Cited

UNITED STATES PATENTS

| | | | |
|---|---|---|---|
| 523,184 | 7/1894 | Thompson et al. | 222—553 |
| 1,725,689 | 8/1929 | Witt | 222—553 |
| 2,529,004 | 11/1950 | Eley | 222—548 X |
| 2,738,765 | 3/1956 | Hart | 119—52 |
| 2,940,639 | 6/1960 | Winter | 222—60 |
| 3,077,975 | 2/1963 | Hobbs | 198—213 |
| 3,113,556 | 12/1963 | Jarvis | 119—51.11 |
| 3,115,866 | 12/1963 | Lawson | 119—56 |
| 3,180,315 | 4/1965 | Moloney | 119—51.11 |

ALDRICH F. MEDBERY, *Primary Examiner.*

U.S. Cl. X.R.

198—213; 222—548, 553